United States Patent
Maassen et al.

(10) Patent No.: US 6,690,102 B2
(45) Date of Patent: Feb. 10, 2004

(54) ELECTRIC LAMP

(75) Inventors: Egbertus Johannes Petrus Maassen, Veldhoven (NL); Raoul Meerten, Amsterdam (NL); Cornelis Versluijs, Elndhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/080,158

(22) Filed: Feb. 20, 2002

(65) Prior Publication Data

US 2002/0149306 A1 Oct. 17, 2002

(30) Foreign Application Priority Data

Feb. 21, 2001 (EP) .............................. 01200620

(51) Int. Cl.[7] .............................. F22V 7/00; H01K 1/32
(52) U.S. Cl. ..................... 313/113; 313/114; 313/579
(58) Field of Search .................. 313/113, 114, 313/315, 316, 579, 573, 634; 362/297, 215, 310

(56) References Cited

U.S. PATENT DOCUMENTS

| 3,569,693 A | * | 3/1971 | Lindae et al. | ............... 313/113 |
|---|---|---|---|---|
| 4,015,158 A | * | 3/1977 | Roller et al. | ................. 313/579 |
| 4,682,072 A | * | 7/1987 | Ichihara et al. | .............. 313/113 |
| 4,788,469 A | * | 11/1988 | Holten | ........................ 313/113 |
| 4,803,394 A | | 2/1989 | Holten | ........................ 313/113 |
| 5,143,447 A | * | 9/1992 | Bertenshaw | ................. 362/297 |
| 5,757,113 A | * | 5/1998 | Binder et al. | ................ 313/114 |

FOREIGN PATENT DOCUMENTS

FR 1096668 6/1955

* cited by examiner

Primary Examiner—Ashok Patel

(74) Attorney, Agent, or Firm—Ernestine C. Bartlett

(57) ABSTRACT

The electric lamp has a light source (3) having a first (31) and a second light-generating portion (32) in a concave reflector (2). The reflector has an axis of symmetry (20) and a first (21) and a second reflector portion (22), each having an optical axis (23 and 24, respectively) which is parallel to the axis of symmetry (20). Each reflector portion (21, 22) surrounds its optical axis (23, 24) for the greater part. The light source portions (31, 32) each coincide with a respective one of the optical axes (23, 24). The lamp produces a light beam which has only one maximum.

8 Claims, 3 Drawing Sheets

ELECTRIC LAMP

The invention relates to an electric lamp provided with:

a concave reflector with a main shape which reflector has an axis of symmetry;

a lamp vessel which is closed in a gastight manner, in the reflector;

a light source having a first and a second light-generating portion in the lamp vessel, said first and second portion being arranged next to one another and on either side of the axis of the reflector, and being connected to current conductors which issue from the lamp vessel to the exterior at an end of said vessel.

Such an electric lamp is known from FR-1 096 668.

The known electric lamp is an incandescent lamp with two filament portions arranged in parallel, which lamp is placed in a separate spherical reflector. The lamp is particularly suitable for use as a motor vehicle headlamp, according to this patent document. The known lamp has the disadvantage that it supplies a light beam with two maxima in the luminous flux, as is shown in FIG. 4, and that it accordingly provides two spots of equal brightness lying next to one another at a distance from one another on a screen placed transversely to the beam. This is not acceptable for a lamp designed for providing accent lighting.

It is indeed possible to make a light beam with only one maximum, but in that case the light source must be linear, for example arranged on the axis of symmetry. This has the disadvantage that the lamp will have a comparatively large dimension then if suitable for operation on mains voltage, and that the reflector must also be bulky. The reflector must be deep in the case of an axial positioning of a linear light source so as to be able to surround the light source substantially completely in lateral directions. In addition, a current conductor must then be returned alongside the light source, which causes a shadow. In a transverse arrangement, the reflector has to be very wide, and the light beam will have an elongate, comparatively low maximum.

It is also possible to make a light beam with only one maximum by positioning the filament in a multiple-fold arrangement. This, however, implies a complicated construction of the lamp and a comparatively low luminous efficacy which is caused by the many comparatively cold spots in the filament arising from the supports necessary for keeping the filament in its folded state.

It is an object of the invention to provide an electric lamp of the kind described in the opening paragraph which is suitable f or creating accent lighting, which is of a simple construction allowing a compact shape, and which supplies a light beam with substantially only one maximum also when operated on mains voltage.

According to the invention, this object is achieved in that the reflector has a first and a second reflector portion, the first and the second reflector portion each have an optical axis substantially parallel to the axis of symmetry and each surround their respective optical axis substantially, and the first and the second light-generating portion coincide at least partly with said first and second optical axis, respectively.

In the lamp according to the invention, the first and the second light-generating portion of the light source each have their own reflector portion which substantially surrounds the light source portion and shapes the light from the respective portion into a beam. The beam portions coincide substantially and form one light spot with one maximum in the illuminance on a screen placed transversely to the beam. Light not radiated by a light source portion to its own reflector portion but hitting the other reflector portion will not be lost, but will be added to the beam. This light contributes to a gradual decrease in the luminous flux in directions enclosing an increasing angle with the axis of symmetry. Added to this is the light which hits the screen without previous reflection by being directly radiated in all directions away from the reflector by the light emission window of the reflector. The proportion of this non-reflected light depends on the value of the spatial angle with which the reflector surrounds the light source. The greater this spatial angle, or in other words: the deeper the reflector, the smaller the proportion of non-reflected light. It is favorable for achieving a comparatively high luminous flux in the beam if the reflector surrounds the light source at least substantially in lateral directions.

The lamp according to the invention will generally have a light beam with a substantially smooth contour from its maximum to its half-value directions, i.e. directions with respect to the axis of symmetry, in which the luminous flux has half the value as compared with the direction of the axis of symmetry, while local sub-maxima are avoided.

Since the reflector portions each substantially surround the associated light-generating portions of the light source, their optical axes have a mutual distance and half this distance to the axis of symmetry. In general, the mutual distance of the optical axes lies between a few and a plurality of mm, for example between 2 and 8 mm. This arises inter alia from the fact that the light-generating portions of the light source are comparatively close together so as to render it possible to introduce the light source into the lamp vessel during lamp manufacture and to obtain a comparatively high luminous efficacy in that heat losses are reduced by placing the portions close together.

The reflector portions may have various shapes. They may be, for example, paraboloidally curved. Alternatively, they may each have a body of revolution of a curve which is composed of several parabola portions. The reflector portions may be smooth, or segments, for example axially directed segments, may be superimposed thereon. The segments may be planar or convex transversely to the optical axis, depending on whether a comparatively narrow, a wider, or a comparatively wide light beam is desired. Planar segments are usually favorable, also for obtaining a tolerance as to the position of the light-generating portions of the light source. Alternatively, the reflector portions may be faceted.

The light source may be an incandescent body, preferably in a gas comprising halogen for obtaining a high luminous efficacy and lumen maintenance during lamp life in that a tungsten-halogen cycle takes place in the lamp. The lamp may in that case be made from quartz glass, hard glass, or a ceramic material, for example sintered aluminum oxide.

The light-generating portions of the light source may be arranged substantially parallel to one another, for example each coinciding substantially with the optical axis of a respective reflector portion. Alternatively, the portions may be in a V-shaped arrangement, for example with the bottom of the V being the part of the portions which is the closest to the light emission window. It is favorable in this arrangement that only one support is necessary for it. With only one support, which is T-shaped at its supporting end, the light source may alternatively be substantially U-shaped, for example with parallel or diverging legs.

The lamp vessel of the lamp according to the invention may have a shape and a reflectorizing layer, for example at an outer surface, such that the lamp itself supports the reflector. Alternatively, if the lamp is a halogen incandescent lamp, the lamp vessel may be accommodated in an outer bulb, for example blown, for example from glass, which bulb is shaped and reflectorized so as to constitute the reflector.

The reflectorization of the lamp vessel or the outer bulb, as applicable, may be a metal layer, for example made of aluminum or silver, or alternatively may be a stack of alternating layers of high and low refractive index, for example $Ta_2O_5$, $Si_3N_4$ and, for example, $SiO_2$, respectively, which stack forms a dichroic mirror.

The reflector may be a separate body in which the lamp vessel is provided. It is favorable if the lamp vessel is indetachably connected to the reflector. The light source may in that case be fixed in the reflector during lamp manufacture in an aligned state, so that the positions of the light-generating portions of the light source with respect to the reflector are secured. The reflector may be a metal body. It is favorable for electrical safety, however, if the reflector is an electrical insulator. It is favorable for the reflector to be a glass body for obtaining a comparatively high thermal load resistance, for example obtained in that molten glass is pressed into the desired shape in a mold and is provided with a reflectorizing layer, such as a layer mentioned above, for example on an inner surface.

In a favorable modification, the reflector has a light emission window which is closed with a disc. This embodiment provides an improved safety, for example as regards the prevention of adjacent combustible objects catching fire, for example if the lamp vessel should break. The disc may have an optical effect, if so desired, for example by means of prismatic structures or a roughened surface so as to direct or scatter emerging light.

In a further favorable modification which may be combined with the preceding one, the reflector has a circular, projecting rim around the light emission window. This modification has the advantage that the lamp has a round shape in front elevation, and thus resembles a conventional lamp in front elevation, merging into a round opening in a holder or luminaire in which the lamp is placed.

A lamp cap, for example an Edison lamp cap or a bayonet lamp cap, for example a bayonet lamp cap with contact pins which have thickened portions at their free ends such as those which are usual in the case of starters for fluorescent lamps, may be present at the reflector for fastening and contacting the lamp in a lampholder.

An embodiment of the electric lamp according to the invention is shown in the drawing, in which.

Figure 1:
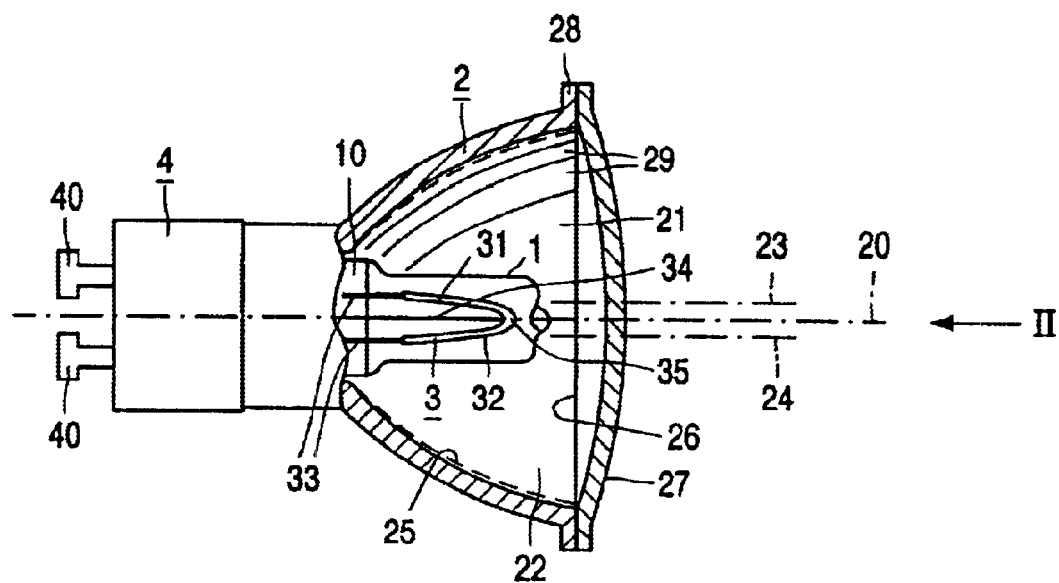
FIG. 1 shows the electric lamp in side elevation with the reflector mainly in axial sectional view.

In FIG. 1, the electric lamp has a lamp vessel 1 which is closed in a gastight manner and a concave reflector 2 with a main shape which has an axis of symmetry 20.

A light source 3 with a first 31 and a second light-generating portion 32 is present in the lamp vessel 1, in the reflector 2. The first 31 and the second portion 32 are arranged next to one another, on either side of the axis 20 of the reflector 2. The light source 3 is connected to current conductors 33 which issue from the lamp vessel 1 to the exterior at an end 10 of said vessel.

The reflector 2 has a first 21 and a second reflector portion 22, each having an optical axis 23, 24 substantially parallel to the axis of symmetry 20, and each substantially surrounding the respective optical axis 23, 24. The first 31 and the second light-generating portion 32 coincide at least partly with the first 23 and the second optical axis 24, respectively.

The reflector 2 at least substantially surrounds the light source 3 in lateral directions. The light source 3 in FIG. 1 lies entirely within the reflector 2.

The lamp vessel 1 in FIG. 1 is made of quartz glass and contains a gas comprising halogen, an inert gas, and hydrogen bromide, while the light source 3 is a tungsten incandescent body. The lamp vessel 1 is closed off at its end 10 by means of a pinch in which a support 34 for the light source 3 is anchored.

The reflector 2 has a light emission window 26 which is closed off with a disc 27.

The light source 3 is positioned in a V-shaped arrangement by means of the support 34 and the current conductors 33. A bottom 35 of the V-shaped arrangement is closest to the light-emission window 26.

The reflector 2 is a molded glass body provided with a reflecting coating 25, made of alternating layers of $SiO_2$ and $Nb_2O_5$ in the Figure.

Figure 2:
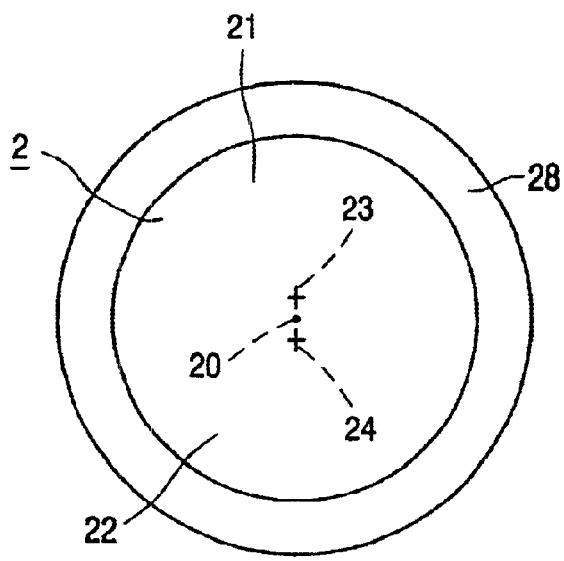
FIG. 2 is a front elevation of the reflector taken on the line II in FIG. 1.

The reflector 2 has a circular projecting rim 28 around the light emission window 26, see FIG. 2.

Segments 29, of which only a few are shown, are superimposed on the main shape of the reflector 2.

The lamp has a lamp cap 4 with pin contacts 40.

In an embodiment of the electric lamp shown, the reflector 2 had a greatest diameter of approximately 65 mm, and the lamp consumed a power of 50 W during operation at 230 V. The optical axes 23, 24 of the reflector portions 21, 22 were at a distance of approximately 3 mm from one another.

Figure 3:
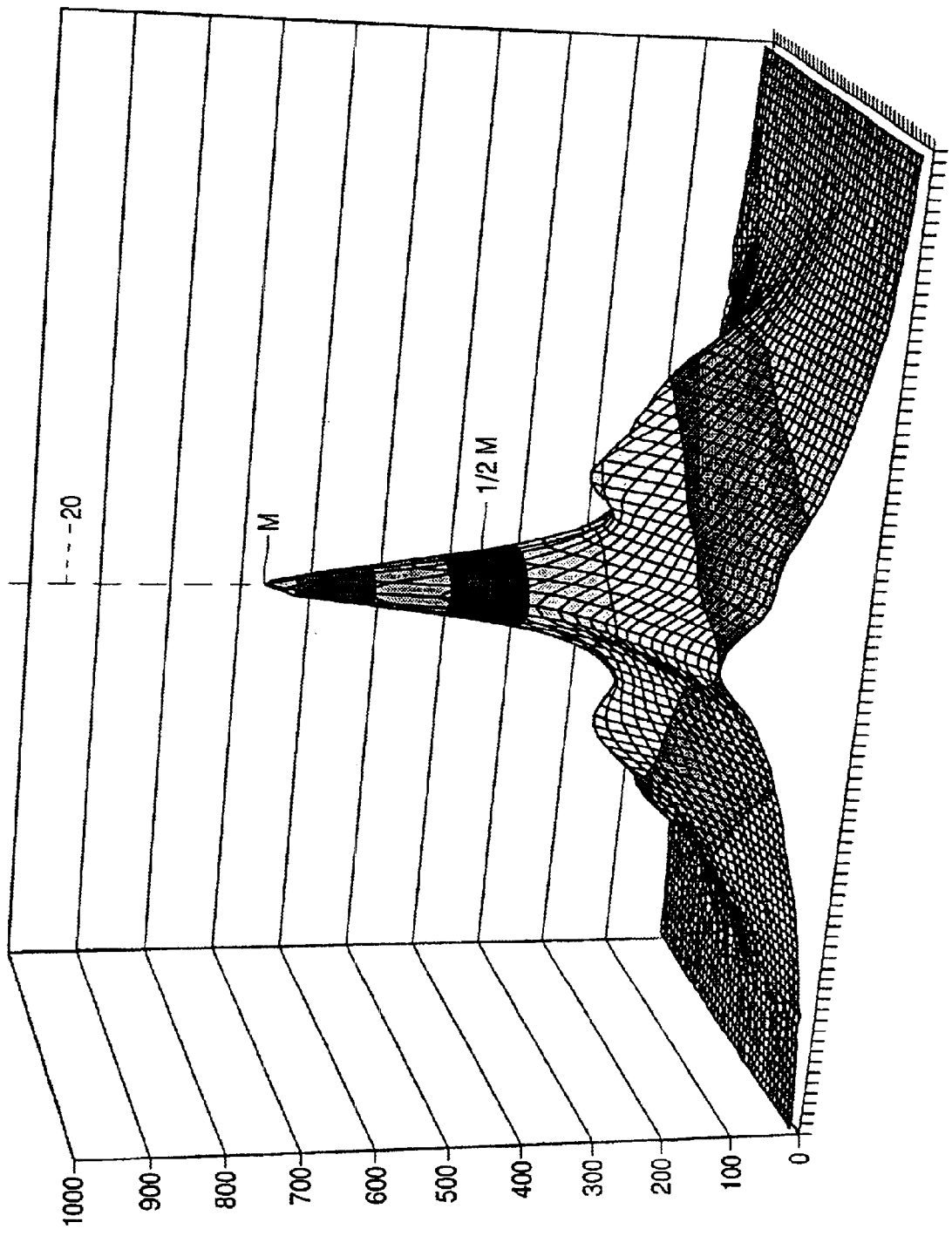
FIG. 3 represents the light beam of the lamp of FIG. 1.

The lamp generated a light beam as shown in FIG. 3, which a maximum M. For comparison, FIG. 4 shows the light beam of a similar light source in the same arrangement in a conventional reflector, which is a body of revolution of the same curve as in the reflector of the lamp according to the invention, around the optical axis, which is accordingly at the same time its axis of symmetry.

Figure 4:
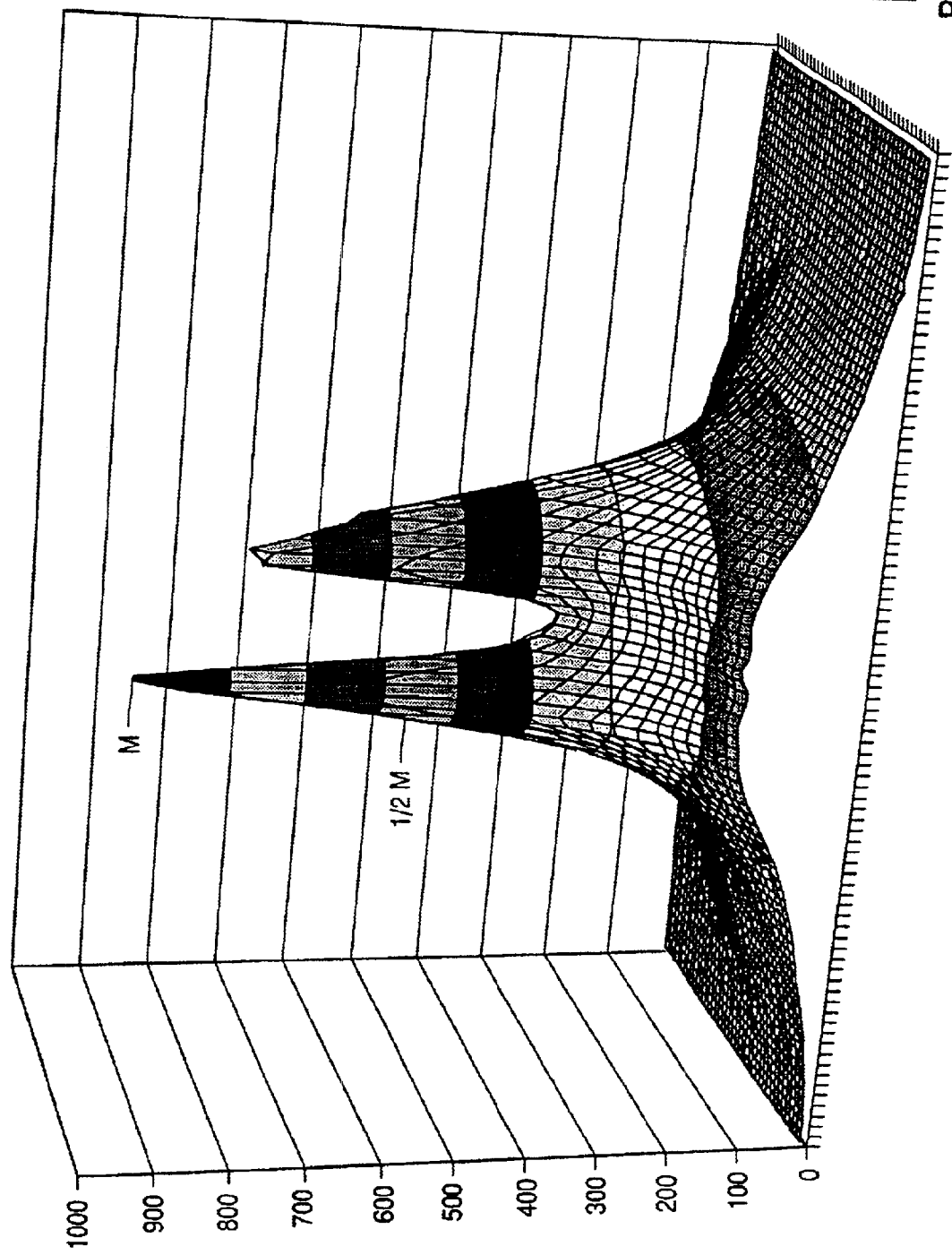
FIG. 4 represents the light beam of a lamp not according to the invention.

It is apparent from a comparison of FIGS. 3 and 4 that the conventional reflector of FIG. 4 gives twin light beams having two maxima M, M' of the same order of magnitude. The maxima lie so far apart that the beam has a value of approximately ¼ M between the maxima. The reflector of the electric lamp according to the invention, on the other hand, forms a light beam with only one maximum M with a smooth contour from the maximum M to far beyond ½ M.

The electric lamp according to the invention is suitable for creating accent lighting. It is of a simple construction and may be of a compact design.

What is claimed is:

1. An electric lamp comprising:
    a concave reflector with a main shape which reflector has an axis of symmetry;
    a lamp vessel, which is closed in a gastight manner, in the reflector; and
    a light source having a first and a second light-generating portion in the lamp vessel, said first and second light-generating portions being arranged next to one another and on either side of the axis of the reflector, and being connected to current conductors which issue from the lamp vessel to the exterior at an end of said vessel,
    characterized in that the reflector comprises a first and a second reflector portion,
    the first and the second reflector portions each having an optical axis substantially parallel to the axis of symmetry, and each substantially surrounding their respective optical axis, and the first and the second light-generating portions coinciding at least partly with said first and second optical axis, respectively.

2. An electric lamp as claimed in claim 1, characterized in that the reflector surrounds the light source at least substantially in lateral directions.

3. An electric lamp as claimed in claim 1, characterized in that the lamp vessel (1) contains a gas comprising halogen, and in that the light source (3) is an incandescent body.

4. An electric lamp as claimed in claim 3, characterized in that the light source is V-shaped.

5. An electric lamp as claimed in claim 3, characterized in that the reflector is a molded glass body provided with a reflecting coating.

6. An electric lamp as claimed in claim 5, characterized in that the reflector includes a light emission window which is closed off by a disc.

7. An electric lamp as claimed in claim 5, characterized in that the reflector includes a circular projecting rim around the light emission window.

8. An electric lamp as claimed in claim 5, characterized in that segments are superimposed on the main shape of the reflect.

* * * * *